United States Patent
Miyazaki et al.

(10) Patent No.: US 8,793,600 B2
(45) Date of Patent: Jul. 29, 2014

(54) IMAGE-PROCESSING DEVICE

(75) Inventors: Sadaaki Miyazaki, Nagoya (JP); Norio Mizutani, Mie-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1456 days.

(21) Appl. No.: 12/130,738

(22) Filed: May 30, 2008

(65) Prior Publication Data

US 2008/0301550 A1 Dec. 4, 2008

(30) Foreign Application Priority Data

Jun. 1, 2007 (JP) ................................. 2007-146959

(51) Int. Cl.
- *G06F 3/048* (2013.01)
- *G06F 3/0481* (2013.01)
- *G06F 17/30* (2006.01)

(52) U.S. Cl.
CPC .......... *G06F 3/0481* (2013.01); *G06F 3/04817* (2013.01)
USPC .......... 715/763; 715/200; 715/204; 715/230; 715/233; 715/275

(58) Field of Classification Search
CPC ........................... G06F 3/0481; G06F 3/04817
USPC .................. 715/200, 204, 230, 233, 275, 763
See application file for complete search history.

(56) References Cited

U.S. PATENT DOCUMENTS

| | | | | |
|---|---|---|---|---|
| 6,154,755 A | * | 11/2000 | Dellert et al. | 715/202 |
| 6,496,206 B1 | * | 12/2002 | Mernyk et al. | 715/835 |
| 6,623,528 B1 | * | 9/2003 | Squilla et al. | 715/202 |
| 7,155,427 B1 | * | 12/2006 | Prothia et al. | 707/694 |
| 7,289,977 B2 | * | 10/2007 | Kawaoka | 386/225 |
| 7,471,402 B2 | * | 12/2008 | Takamatsu et al. | 358/1.13 |
| 2005/0246640 A1 | * | 11/2005 | Lacy | 715/713 |
| 2007/0159658 A1 | * | 7/2007 | Kato | 358/3.21 |

FOREIGN PATENT DOCUMENTS

| | | |
|---|---|---|
| JP | 2003-333513 | 11/2003 |
| JP | 2004-96688 | 3/2004 |
| JP | 2004-312124 | 11/2004 |
| JP | 2006-338214 | 12/2006 |

* cited by examiner

*Primary Examiner* — Stephen Hong
*Assistant Examiner* — Wilson Tsui
(74) *Attorney, Agent, or Firm* — Scully, Scott, Murphy & Presser, PC

(57) ABSTRACT

An image-processing device includes a first memory, a determining unit, a creating unit, and an outputting unit. The first memory stores a first file and a second file. The first file includes first printing data and first additional information. The second file includes second printing data second additional information. The determining unit determines whether or not the first file is a distinguishable file. The distinguishable file is distinguishable from the second file based on the first additional information and the second additional information. The creating unit creates index data based on determination made by the determining unit. The index data includes first indicative data corresponding to the first file and second indicative data corresponding to the second file. The outputting unit outputs index image based on the index data.

18 Claims, 11 Drawing Sheets

FIG.11
Index Sheet
(1)
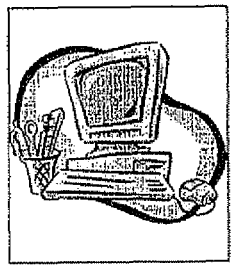
FileName1.pdf
200KB   07/02/08
(2)
FileName2.pdf
100KB   07/02/08
(3)
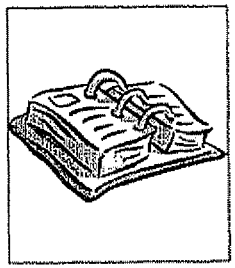
Sample123.pdf
100KB   07/02/08
(4)
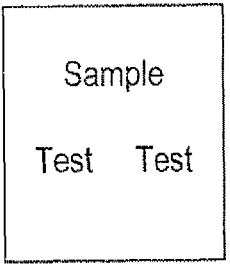
Test 345.pdf
100KB   07/02/08

IMAGE-PROCESSING DEVICE

CROSS REFERENCE TO RELATED APPLICATION

This application claims priority from Japanese Patent Application No. 2007-146959 filed Jun. 1, 2007. The entire content of its priority application is incorporated herein by reference.

TECHNICAL FIELD

The present invention relates to an image-processing device, a method executed by the image-processing device, and a computer readable recording medium storing a set of program instructions executable on the image processing device.

BACKGROUND

An image-forming device for a conventional stator disclosed in Japanese unexamined patent application publication No. 2003-333513, for example, creates index data allowing a user to view a plural pieces of image data (image files) stored in an external storage as thumbnail images. If the image file contains preview image data independently of actual image data, the image-forming device creates the index data using the preview image.

In the above invention, expanding the image file is required for determining whether or not each piece of image data contains preview image data, for all image file stored in the external storage. Accordingly, the amount of time required for creating index data is difficult to reduce.

SUMMARY

In view of the foregoing, it is an object of the intention to provide an image-processing device, a method executed by the image-processing device, and a computer readable recording medium storing a set of program instructions executable on the image-processing device capable of reducing the time required for creating index data.

In order to attain the above and other objects, the invention provides an image-processing device including a first memory, a determining unit, a creating unit, and an outputting unit. The first memory stores a first file and a second file. The first file includes first printing data and first additional information. The second file includes second printing data second additional information. The determining unit determines whether or not the first file is a distinguishable file. The distinguishable file is distinguishable or discernable from the second file based on the first additional information and the second additional information. The creating unit creates index data based on determination made by the determining unit. The index data includes first indicative data corresponding to the first file and second indicative data corresponding to the second file. The outputting unit outputs index image based on the index data.

According to another aspect, the present invention provides a method executed by an image-processing device, the method including: determining whether or not first file is a distinguishable file, the distinguishable file being distinguishable from second file based on first additional information and second additional information, the first file including first printing data and the first additional information, and the second file including second printing data and the second additional information; creating index data based on determination made in the determining process, the index data including first indicative data corresponding to the first file and second indicative data corresponding to the second file; and outputting index image based on the index data.

According to another aspect, the present invention provides a computer readable recording medium storing a set of program instructions executable on an image-processing device, instructions including: determining whether or not first file is a distinguishable file, the distinguishable file being distinguishable from second file based on first additional information and second additional information, the first file including first printing data and the first additional information, and the second file including second printing data and the second additional information; creating index data based on determination made in the determining process, the index data including first indicative data corresponding to the first file and second indicative data corresponding to the second file; and outputting index image based on the index data.

BRIEF DESCRIPTION OF THE DRAWINGS

The particular features and advantages of the invention as well as other objects will become apparent from the following description taken in connection with the accompanying drawings, in which:

FIG. 11 shows exemplary index data created by and outputted from an image-forming device according to a conventional invention.

DETAILED DESCRIPTION

Figure 1:
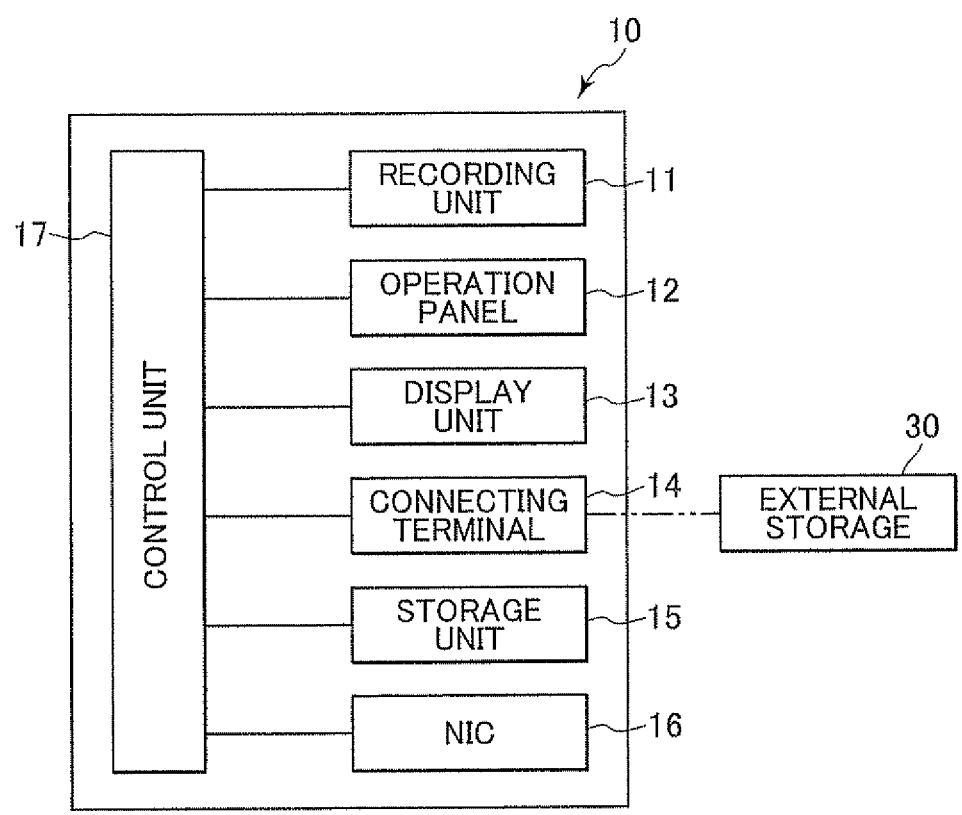
FIG. 1 is a block diagram briefly showing an image-processing device according to a first embodiment of the present invention.

An image-processing device according to embodiments of the invention will be described while referring to the accompanying drawings wherein like parts and components are designated by the same reference numerals to avoid duplicating description.

Referring to FIG. 1, a printer 10 includes a recording unit 11 for forming an image on a recording medium such as a recording sheet; an operation panel 12 by which a user gives instructions to the printer 10; a display unit 13 for displaying various kinds of information thereon; a connecting terminal 14 to which an external storage 30 is detachably connected; a network interface card (NIC) 16 as an interface for network connection; a storage unit 15 which stores alternative image data described later; and a control unit 17 for controlling the recording unit 11 and the like.

The control unit 17 includes a known microcomputer having a CPU, a ROM, and a RAM. The ROM stores programs for taking control to be described later. The connecting terminal 14 is a USB (Universal Serial Bus)-compliant interface.

The external storage 30 is a storage unit including an interface connectable to the connecting terminal 14. Specifically, an USB memory and a SD memory (registered trademarks, which include a nonvolatile semiconductor storage, such as a flash memory, can be employed as the external storage 30. A digital camera supporting the communication standard PictBridge can also be employed as the external storage 30. This standard allows an image to be printed directly either from a magnetic storage such as a HDD or from the printer 10.

The printer 10 can directly print a print file stored in the external storage 30 connected to the connecting terminal 14, without involving a computer (not shown). Hereinafter, this printing type is referred to as "direct printing".

The print file contains data can be executed by the printer 10 and can be direct-printed. The printer 10 can direct-print image files created in BMP (Bit Map) and in JPEG (Joint Photographic Experts Group) format, and image data described in a specific page description language (PDL).

Figure 4:
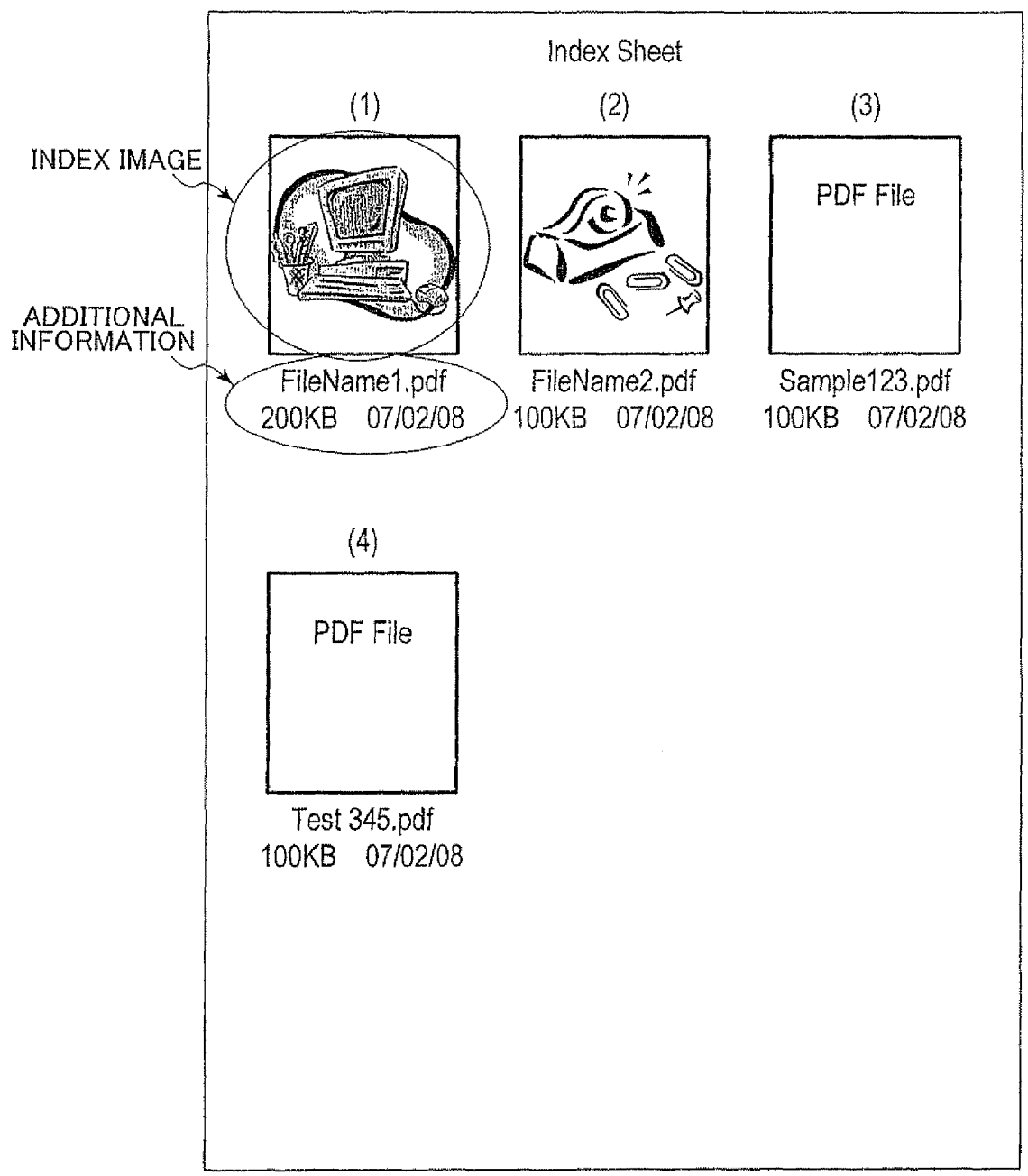
FIG. 4 shows exemplary index data created by and outputted from the image-processing device according to the first embodiment.

As shown in FIG. 4, the index data allows the user to view the print files stored in the external storage as thumbnail images. The index data are created by arranged pieces of indicative data corresponding to the respective print files stored in the external storage 30. The indicative data is configured of index image data and additional information for each print file described later. The indicative data shows the contents of the printing data stored in the print file.

Each print file includes printing data and additional information. The printer 10 prints an image on the recording medium based on the printing data and the index data.

The additional information at least contains a name of the print file. The file name includes a series of characters specifying the file's format such as an extension. The additional information also contains a size of the print file, creation date and time when the print file was created, and last update date and time when the print file was last updated.

The index image of each piece of index data is a sort of "label" which shows the contents of each print file. The index data allows the user to distinguish one print file from the others so that the user can find the distinguished print file easily.

In the printer 10, when the user instructs index data to be outputted, the index data is created so that the user can view the print files stored in the external storage 30. The created index data is then printed out.

Figure 2:
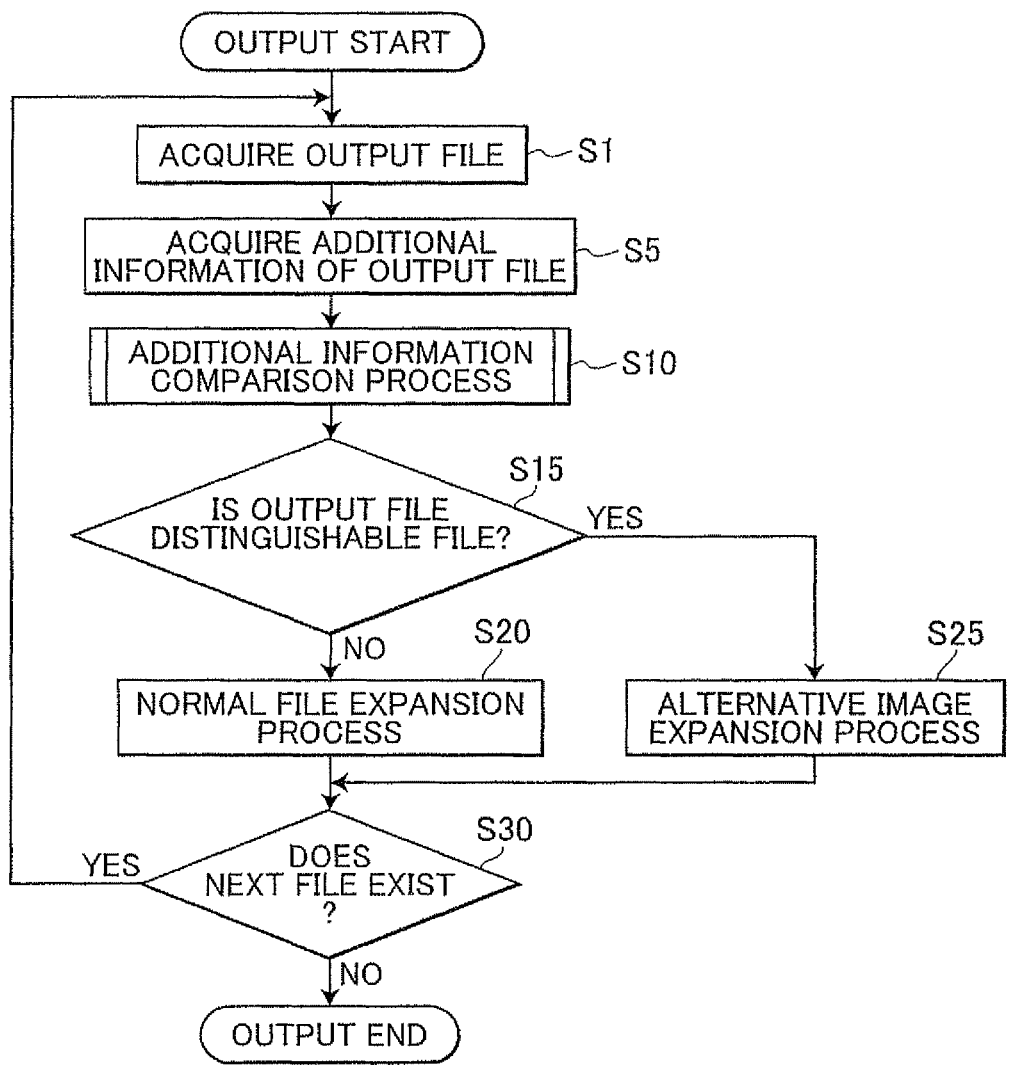
FIG. 2 is a flowchart showing an outputting process executed by the image-processing device according to the first embodiment.

Specifically, when the user instructs index data to be outputted through the operation panel 12 in a state that the external storage 30 is connected to the connecting terminal 14, the control unit 17 starts the output process shown in the flowchart of FIG. 2.

FIG. 2 is a flowchart showing output process as main control process. When a user instructs index data to be outputted (printed) through the operation panel 12, this process is executed by the control unit 19.

If the user instructs index data to be outputted in a state that the external storage 30 is not connected to the connecting terminal 14, the control unit 17 controls, the display unit 13 to display a warning message that the external storage 30 is not connected to the connecting terminal 14.

When the control unit 17 starts the output process, in S1, the control unit 17 acquires any one of the print files stored in the external storage 30 connected to the connecting terminal 14. Hereinafter, the print file acquired in S1 is referred to as an "output file" on the ground that the acquired print file is to be outputted. In S5, the control unit 17 acquires the additional information of the output file.

In an additional information comparison process of S10, the control unit 17 determines that the output file is distinguishable file or indistinguishable file. The distinguishable file is a print file that can be distinguished from the other print files stored in the external storage 30 based on the additional information. The indistinguishable file is a print file that cannot be distinguished from the other print files based on the additional information.

Figure 3:
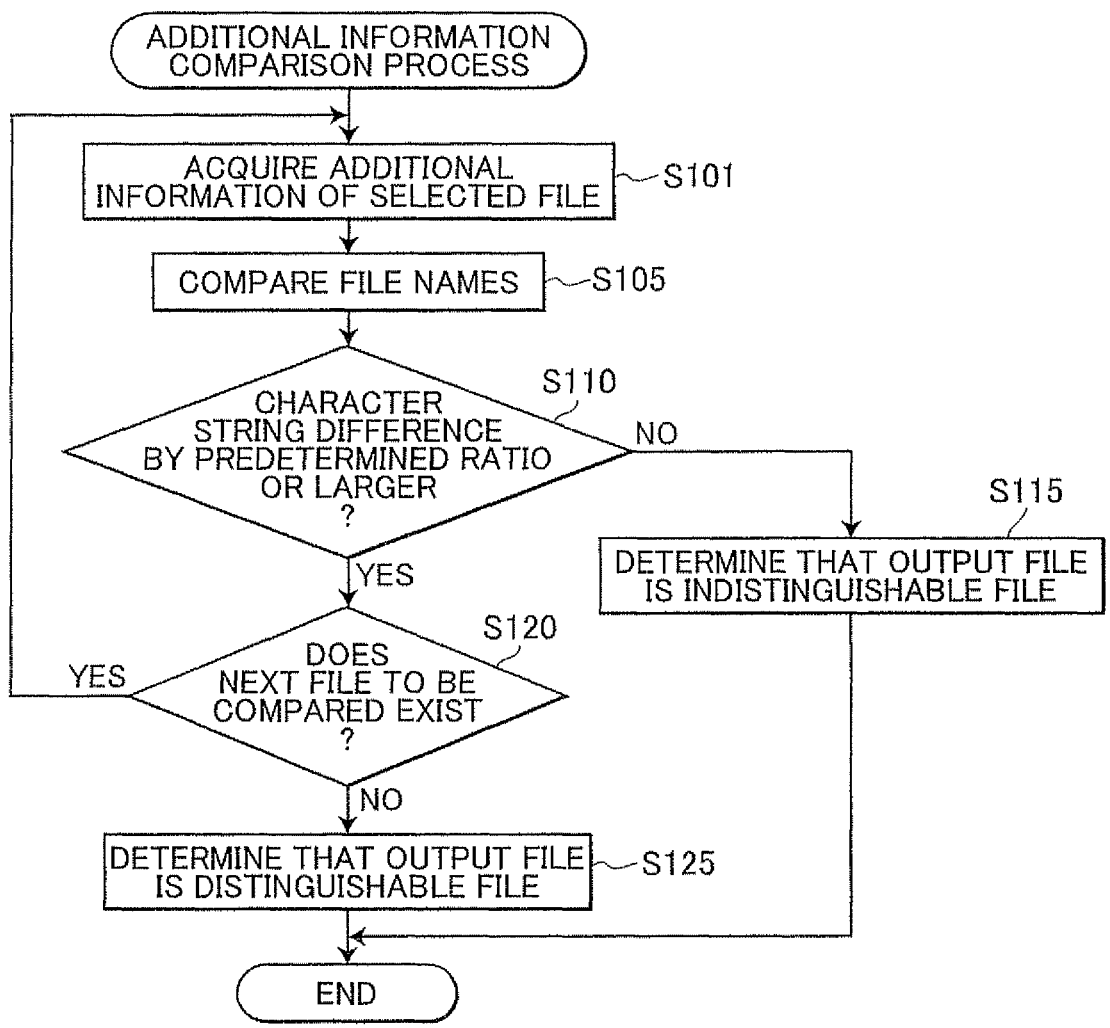
FIG. 3 is a flowchart showing a comparing process of the outputting process according to the first embodiment.

As shown in FIG. 3, in S101 of the additional information comparison process, the control unit 17 selects one of the print files stored in the external storage 30 other than the output file. The control unit 17 then acquires the additional information of the selected print file (hereinafter, the selected print file is referred to a "selected file"). In S105, the control unit 17 compares the name of the output file with the name of the selected file.

In S110, the control unit 17 determines whether or not the character string specifying the output file name is different from the character string specifying the selected file name by a predetermined ratio or larger. If the matching rate between the character strings is a predetermined percentage or larger, the control unit 17 determines that the file names match with each other. Otherwise, the control unit 17 determines that the file names do not match with each other.

If the control unit 17 has determined that the file names are not different from each other by the predetermined ratio or larger (S110: NO), the control unit 17 sets a flag indicating that the currently compared output file cannot be distinguished from the other print files only based on the additional information in S115. In other words, the control unit 17 determines that the output file is the indistinguishable file.

On the other hand, if the control unit 17 has determined that the file names are different from each other by the predetermined ratio or larger (S110: YES), the control unit 17 determines whether or not the external storage 30 stores another print file to be compared with the output file in S120. Specifically, the control unit 17 determines whether or not the external storage 30 stores any other print file which has not been compared with the output file in file name.

If the control unit 17 has determined that any other print file is left to be compared with the output file in the external storage 30 (S120: YES), the control unit 17 returns to S101. In S105 and S110, the control unit 17 further selects the left print file so as to determine whether or not the name of the newly selected file is different from the name of the output file by the predetermined ratio or larger.

On the other hand, if the control unit 17 has determined that no other print file is left to be compared with the output file in the external storage 30 (S120: NO), in S125, the control unit 17 regards the output file as distinguishable from all the files other than the output file stored in the external storage 30. In other words, the control unit 17 determines that the output file is a distinguishable file. The control unit 17 flags the output file to indicate the fact.

Returning to FIG. 2, in S15, the control unit 17 determines whether or not the output file is the distinguishable file determined in S10. If the control unit 17 has determined that the output file is the indistinguishable file (S15: NO), the control unit 17 creates indicative data of the output file in a normal file expansion process of S20.

In the normal file expansion process, the control unit 17 rasterizes the printing data stored in the output file to create index image data and arranges the indicative data at a position in the index data, the indicative data including the index image data and the additional information. If the output file stores plural pieces of printing data, either one of the first piece of printing data to be found and first page of the output file is rasterized or converted to the index image data.

If the control unit 17 has determined that the output file is the distinguishable file (S15: YES), the control unit 17 creates index image data in an alternative image expansion process of S25. In the alternative image expansion process, the control unit 17 creates indicative data by using any one piece of alternative image data stored in the storage unit 15 as the index image data of the output file. The control unit 17 arranges the indicative data at a position in the index data, the indicative data including the alternative image data as the index image data, and the additional information. The alternative image data is decided based on the format of the output file. The alternative image data is preferably smaller than each print file whose size is approximately 10 kB. Preferably, the size of the alternative image data is possible smaller.

In S30, the control unit 17 determines whether or not the external storage 30 stores another print file. Specifically, the control unit 17 determines whether or not the external storage 30 stores any print file that has not been determined whether the distinguishable file or undistinguishable file yet. If the control unit 17 has determined that another print file is left to be determined whether the distinguishable file or indistinguishable file (S30: YES), the control unit 17 returns to S1. If the control unit 17 has determined that no print file is left to be determined (S30: NO), the created index data is printed out. Then the output process ends.

The image based on the index image data is a sort of "label" which shows the contents of each print file. The index data allows the user to distinguish one print file from the others so that the user can find the distinguished print file easily.

In this case, the index image data does not mean the image data which has been extracted by expanding each print file. The index data have only to distinguish one print file from the others so that the user can specify the distinguished print file easily.

In this embodiment, the control unit 17 determines whether or not the output file is distinguishable from the other print files based on the additional information added to the print files. If the control unit 17 has determined that the output file is the distinguishable file, the control unit 17 creates the index data (see FIG. 4) of the print files stored in the external storage 30 based on the determination result, without expanding the print file. With this construction, without being expanded all print files to create index data, the printer 10 can reduce the time required for creating index data.

Further, if the control unit 17 determines that the output file is the distinguishable file, the control unit 17 creates index data with the alternative image data stored in the storage unit 15 as the index label of the print file, without expanding the distinguishable print file. With this construction, without being expanded all print files to create index data, the printer 10 can reduce the time required for creating the index data.

As shown in FIG. 4, the print files corresponding to indicative data (1) and indicative data (2) respectively, are indistinguishable from each other, based on the additional information. The print files corresponding to indicative data (3) and indicative data (4) respectively, are distinguishable from all other print files.

For the indicative data (3) and the indicative data (4), the alternative image data stored in the storage unit 15 is used as their index image data, instead of rasterizing their printing data. For example, as shown in FIG. 4, an image saying "PDF FILE" is displayed on the display unit 17 based on the alternative image data. For the indicative data (1) and the indicative data (2), the index image data created by rasterizing printing data or expanding each of the corresponding print files is used.

In the first embodiment, the control unit 17 determines whether or not the output file is distinguishable from the other print files in consideration of the whole character strings of the file names. In a second embodiment, the control unit 17 determines whether or not the output file is distinguishable from the other print files by comparing name within a range of characters of the file name. This range is defined based on the number of characters printable when index data is outputted (printed out), for example, within the range of eight characters.

Figure 5:
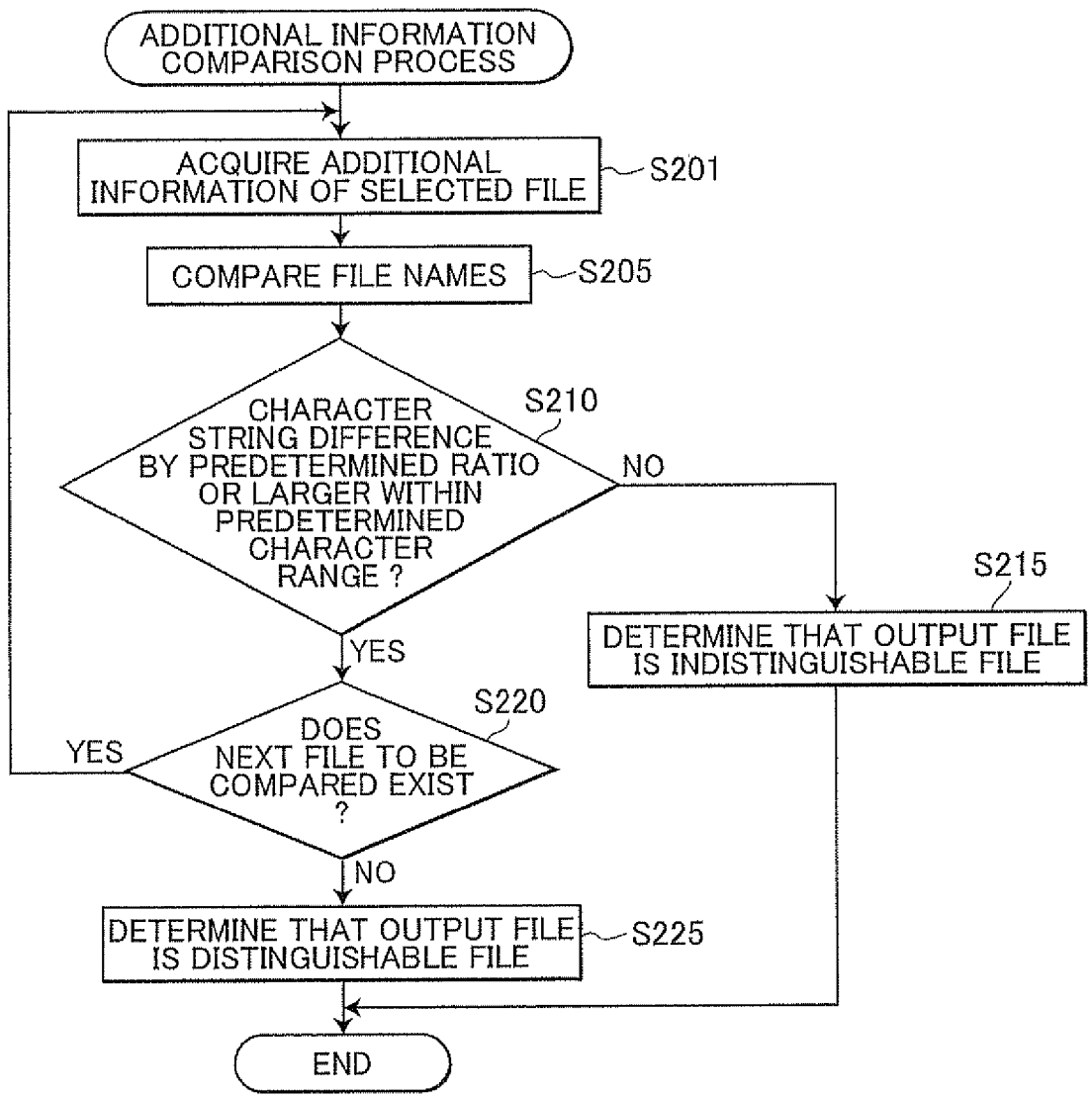
FIG. 5 is a flowchart showing a comparing process according to a second embodiment of the present invention.

FIG. 5 is a flowchart showing the additional information comparison process according to the second embodiment. In S201, the control unit 17 selects one of the print files stored in the external storage 30 other than the output file. The control unit 17 then acquires the additional information of the selected file. In S205, the control unit 17 compares the name of the additional information of the output file with the name of the selected file.

In S210, the control unit 17 determines whether or not the character string specifying the output file name is different from the character string specifying the selected file name by a predetermined ratio or larger within a predetermined range of characters. In the second embodiment, the string composed of eight characters ranging from the left end of the string specifying each file name is defined as the predetermined range of characters.

If the control unit 17 has determined that the file names are not different from each other by the predetermined ratio or larger (S210: NO), the control unit 17 sets a flag indicating that the currently compared output file is the indistinguishable file in S215.

On the other hand, if the control unit 17 has determined that the file names are different from each other by a predetermined ratio or larger (S210: YES), the control unit 17 determines whether or not the external storage 30 stores another print file to be compared with the output file in S220.

If the control unit 17 has determined that any other print file is left to be compared with the output file in the external storage 30 (S220: YES), the control unit 17 returns to S201. In S205 and S210, the control unit 17 further selects the left print file so as to determine whether or not the name of the newly-selected file is different from the name of the output file by the predetermined ratio or larger.

On the other hand, if the control unit 17 has determined that no other print file is left to be compared with the output file in the external storage 30 (S220: NO), in S225, the control unit 17 regards the output file as the distinguishable file. The control unit 17 flags the output file to indicate the fact. The additional information comparison process ends then.

In the second embodiment, the control unit 17 determines whether or not the output file is distinguishable from the other print files within the range of characters printable (can be outputted) for the file names. This means that the character range on which the control unit 17 makes this determination based is recognizable to the user. Accordingly, this determination coincides with the result if the user determines whether or not the output file is distinguishable file based on the visible characters of the file names.

For example, referring to FIG. 4, the control unit 17 determines whether or not the eight characters ranging from the left end of the respective file names are different from each other by 50% or larger. The string "FileName" composed of eight characters ranging from the left end of the name of the print file corresponding to indicative data (1) and the string "FileName" composed of eight characters ranging from the left end of the name of the print file corresponding to indicative data (2) are not different from each other by 50% or larger. Therefore, the control unit 17 determines that the output file and the print files are indistinguishable from each other.

Furthermore, both the string "Sample12" composed of eight characters ranging from the left end of the name of the print file corresponding to indicative data (3) and the string "Test345" composed of eight characters ranging from the left end of the name of the print file corresponding to indicative data (4) are different from the string composed of eight characters ranging from the left end of the name of the print file corresponding to other indicative data by 50% or larger. Therefore, the control unit 17 determines that the output file and the print files are distinguishable from each other.

In the first and second embodiments, the image data stored in the storage unit 15 is employed only for the index image of each distinguishable file. In a third embodiment, the control unit 17 regards one of indistinguishable files as the distinguishable file. For the indistinguishable file regarded as distinguishable (hereinafter, referred to as a "distinguishable-regarded file"), the control unit 17 creates indicative data by employing the image data stored in the storage unit 15.

Figure 6:
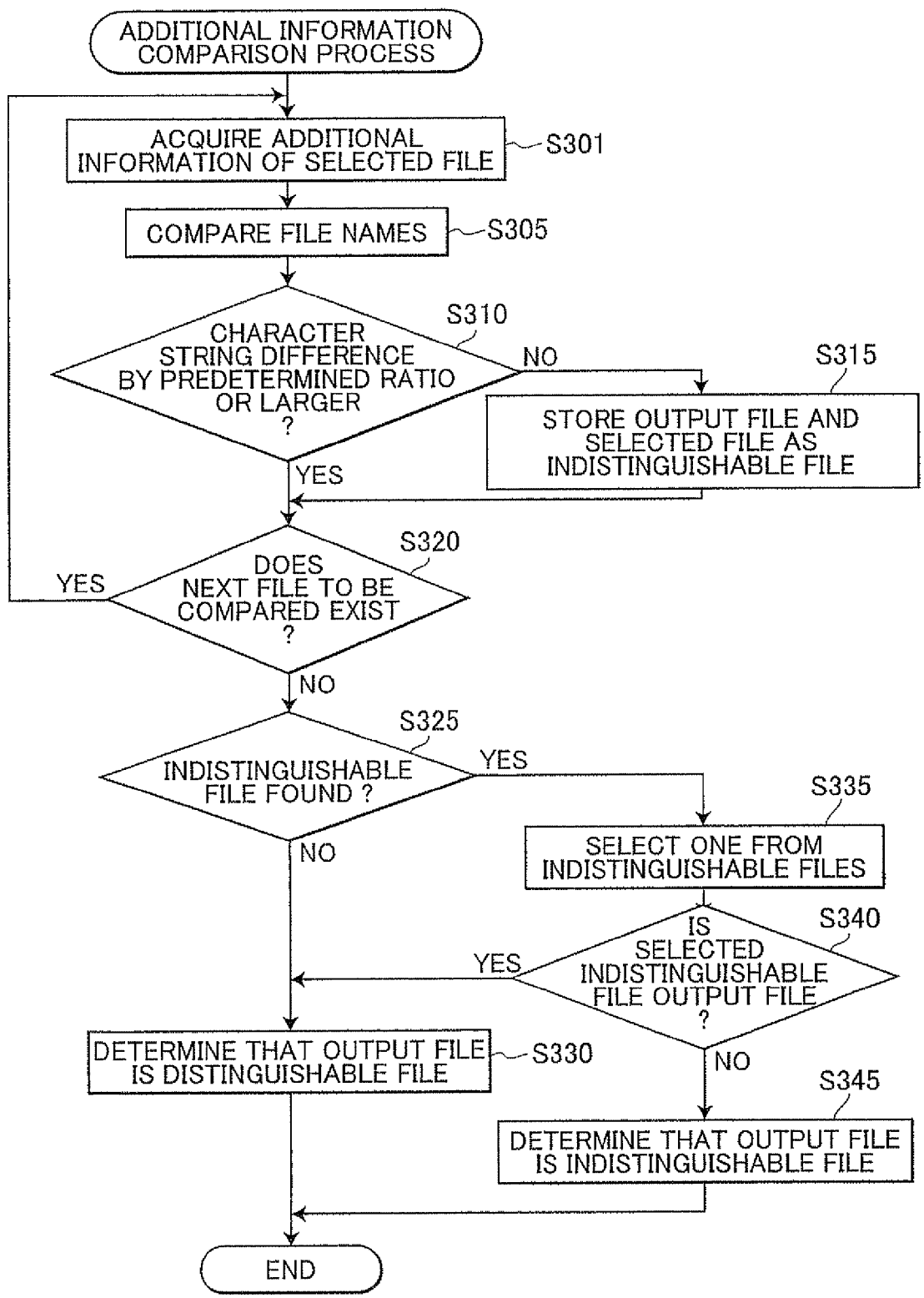
FIG. 6 is a flowchart showing a comparing process according to a third embodiment of the present invention.

FIG. 6 is a flowchart showing an additional information comparison process according to the third embodiment. In S301, the control unit 17 selects one of the print files stored in the external storage 30 other than the output file, as the selected file. The control unit 17 then acquires the additional information of the selected file. In S305, the control unit 17 compares the name of the output file with the name of the selected file.

In S310, the control unit 17 determines whether or not the character string specifying the output file name is different from the character string specifying the selected file name by a predetermined ratio or larger. If the control unit 17 has determined that the file names are not different from each other by the predetermined ratio or larger (S310: NO), in S315 the control unit 17 stores the output file and the selected filer as the indistinguishable file, in the RAM.

On the other hand, the control unit 17 has determined that the file names are different from each other by the predetermined ratio or larger (S310: YES), the control unit 17 determines whether or not the external storage 30 stores another print file to be compared with the output file in S320.

If the control unit 17 has determined that any other print file is left to be compared with the output file in the external storage 30 (S320: YES), the control unit 17 returns to S301. In S305 and S310, the control unit 17 further selects the left print file so as to determine whether or not the name of the newly-selected file is different from the name of the output file by the predetermined ratio or larger.

On the other hand, if the control unit 17 has determined that no other print file is left to be compared with the output file in the external storage 30 (S320: NO), the control unit 17 determines whether or not there is any print file which has been stored as the indistinguishable file in S325.

If the control unit 17 has determined that there is no indistinguishable file (S325: NO), in S330, the control unit 17 regards the currently compared output file as distinguishable from the other print files stored in the external storage 30. The control unit 17 flags the output file to indicate the fact. Then the additional information comparison process ends.

If the control unit 17 has determined that there is any indistinguishable file (S325: YES), in S335, the control unit 17 selects only one print file from the file group composed of the currently compared output file and the selected files as the indistinguishable file stored in S315. In S340 the control unit 17 determines whether or not the print file selected in the S335 is the same as the currently compared output file.

In the third embodiment, in order to select one file from the file group in S335, for example, the control unit 17 selects the last print file created or updated. It the control unit 17 creates indicative data based on the alternative image data stored in the storage unit 15 as the index image for the print file selected, the user is likely to distinguish the contents of the selected print file even when the control unit 17 outputs the alternative image. This is because the selected file is the latest in date or time.

If the control unit 17 has determined that the print file selected in S335 is the same as the currently compared output file (S340: YES), in S330, the control unit 17 regards the currently compared output file as distinguishable from the other files stored in the external storage 30. The control unit 17 flags the output file to indicate the fact. Then, the additional information comparison process ends.

On the other hand, if the control unit 17 has determined that the print file selected in S335 is not the same as the currently compared output file (S340: NO), in S345, the control unit 17 regards the currently compared output file as indistinguishable from the other print files only based on the additional information. The control unit 17 flags the output file to indicate the fact.

In the third embodiment, similarly to the foregoing embodiments, the control unit 17 creates indicative data for each distinguishable file by using any piece of image data stored in the storage unit 15.

If there are plural indistinguishable print files, the control unit 17 regards any one of the indistinguishable print files as distinguishable. The printer 10 according to the third embodiment can prevent all the indistinguishable files from being expanded, thereby reducing the time required for creating index data.

Further, since index data is created by regarding one of the indistinguishable print files as distinguishable, the user is unlikely to confuse the regarded print file with the other print files.

Figure 7:
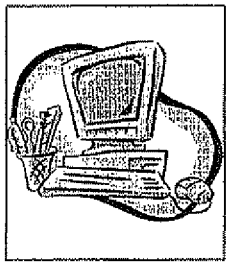
FIG. 7 shows exemplary index data outputted from the image-processing device according to the third embodiment.

FIG. 7 shows exemplary index data outputted from the printer 10 according to the third embodiment. In FIG. 7, the print files corresponding to indicative data (1) and indicative data (2) respectively, are, indistinguishable from each other. The print files corresponding to indicative data (3) and indicative data (4) respectively, are distinguishable from each other.

In this case, the print file corresponding to the indicative data (2) is regarded as distinguishable, out of the indistinguishable print files corresponding to the indicative data (1) and the indicative data (2), respectively. For the indicative data (2) to (4), the alternative image data stored in the storage unit 15 is employed as their index image. For the indicative data (1), the image data obtained by expanding the print file is employed as its index image.

As shown in FIG. 7, the indicative data (1) and the indicative data (2), both of which are contained in the indistinguishable print files, display the date of creation or update "07/02/08". The print files corresponding to the indicative data (1) and the indicative data (2) also have the time of creation or update as their additional information although the information cannot be displayed. The control unit 17 also takes the time of creation or update into consideration. As a result, the control unit 17 determines that the print file corresponding to the indicative data (2) is later than the print file corresponding to the indicative data (1) in date and time of creation or update.

In a fourth embodiment, a modification is made to the additional information comparison process according to the third embodiment. Specifically, when the control unit 17 selects one from plural indistinguishable print files, the control unit 17 regards the print file having the largest size as distinguishable.

Figure 8:
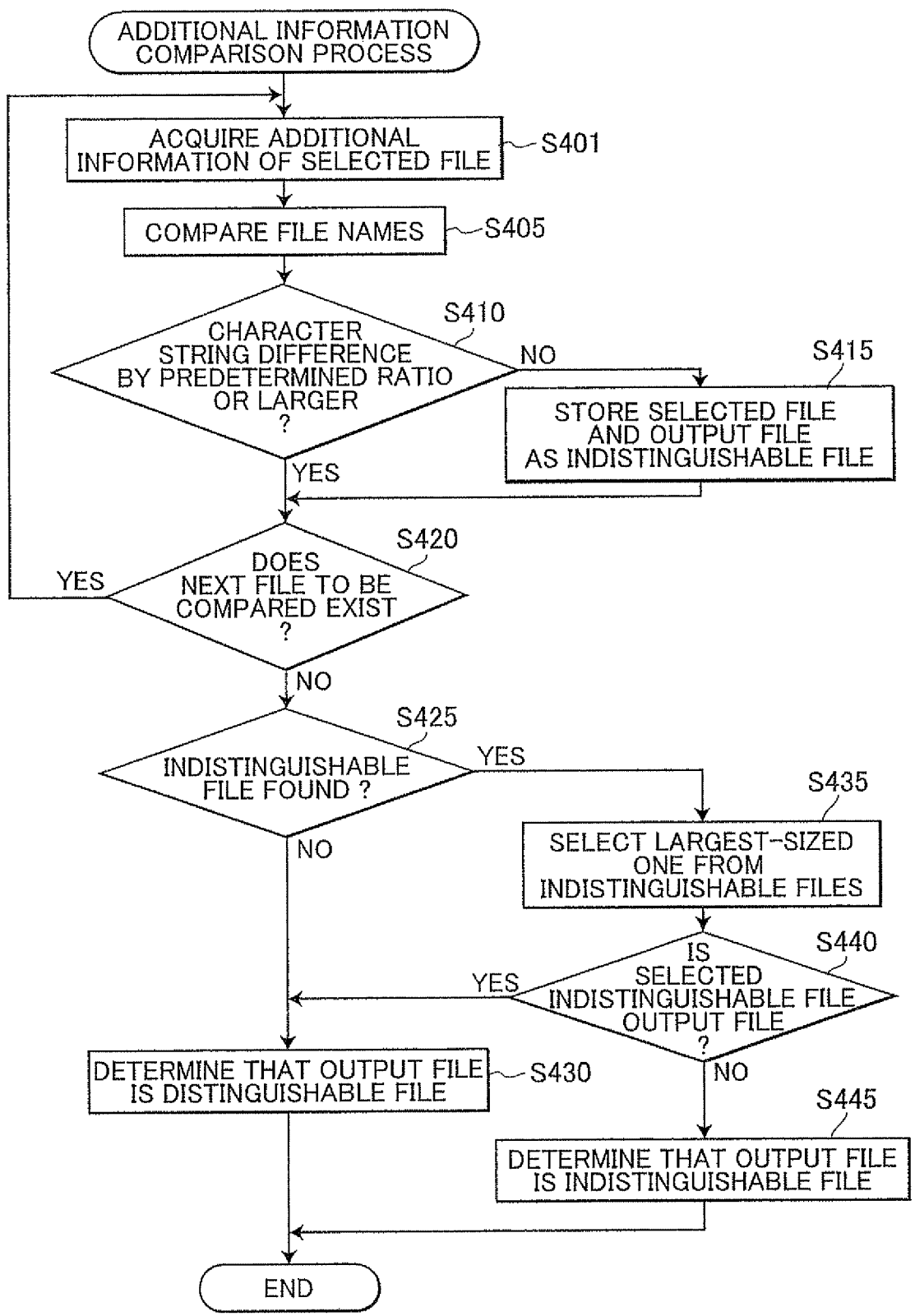
FIG. 8 is a flowchart showing a comparing process according to a fourth embodiment of the present invention.

FIG. 8 is a flowchart showing an additional information comparison process according to the fourth embodiment. The control unit 17 starts the additional information comparison process. In S401, the control unit 17 selects one of the print files stored in the external storage 30 other than the output file, as the selected file. The control unit 17 then acquires the additional information of the selected print file. In S405, the control unit 17 compares the name of the output file with the name of the selected file.

In S410, the control unit 17 determines whether or not the character string specifying the output file name is different from the character string specifying the selected file name by a predetermined ratio or larger. If the control unit 17 has determined that the file names are not different from each other by the predetermined ratio or larger (S410: NO), the control unit 17 stores the selected file in the RAM as the indistinguishable file in S415.

On the other hand, the control unit 17 has determined that the file names are different from each other by the predetermined ratio or larger (S410: YES), the control unit 17 determines whether or not the external storage 30 stores another print file to be compared with the output file in S420.

If the control unit 17 has determined that any other print file is left to be compared with the output file in the external storage 30 (S420: YES), the control unit 17 returns to S401. In S405 and S410, the control unit 17 further selects the left print file so as to determine whether or not the name of the newly-selected file is different from the name of the output file by the predetermined ratio or larger.

On the other hand, if the control unit 17 has determined that no other print file is left to be compared with the output file in the external storage 30 (S420: NO), the control unit 17 determines whether or not there is any print file which has been stored as an indistinguishable file in S425.

If the control unit 17 has determined that there is no indistinguishable file (S425: NO), in S430, the control unit 17 regards the currently compared output file as distinguishable from the other files stored in the external storage 30. The control unit 17 flags the output file to indicate the fact. Then, the control unit 17 ends the additional information comparison process.

If the control unit 17 has determined that there is any indistinguishable file (S425: YES), in S435, the control unit 17 selects the largest-sized print file from the file group composed of the currently compared output file and the file stored in S415. In S440, the control unit 17 determines whether or not the print file selected in the S435 is the same as the currently compared output file.

If the control unit 17 has determined that the print file selected in S435 is the same as the currently compared output file (S440: YES), in S430, the control unit 17 regards the currently compared output file as distinguishable from the other files stored in the external storage 30. The control unit 17 flags the output file to indicate the fact.

On the other hand, if the control unit 17 has determined that the print file selected in S435 is not the same as the currently compared output file (S440: NO), in S445, the control unit 17 regards the currently compared output file as the indistinguishable file that is indistinguishable from the other print files only based on the additional information. The control unit 17 sets a flag indicating the fact.

In the fourth embodiment, similarly to the foregoing embodiments, the control unit 17 creates indicative data for each distinguishable file by employing the alternative image data stored in the storage unit 15.

If there are plural indistinguishable files, the control unit 17 regards the indistinguishable file having the largest size as the distinguishable file. The printer 10 according to the fourth embodiment can prevent all the indistinguishable files from being expanded, thereby reducing the time required for creating index data further effectively.

In the fourth embodiment, since index data is created by regarding one of the indistinguishable files as distinguishable, the user is unlikely to confuse the regarded print file with the other print files.

Figure 9:
FIG. 9 shows exemplary index data outputted from the image-processing device according to the fourth embodiment.

FIG. 9 shows exemplary index data outputted from the printer 10 according to the fourth embodiment. In FIG. 9, the print files corresponding to indicative data (1) and indicative data (2) respectively, are indistinguishable from each other. The print files corresponding to indicative data (3) and indicative data (4) respectively, are distinguishable from each other.

In this case, the print file corresponding to the indicative data (1) is regarded as the distinguishable file, out of the indistinguishable files corresponding to the indicative data (1) and the indicative data (2), respectively. For the indicative data (1), (3) and (4), the alternative image data stored in the storage unit 15 is used as their index image data. For the indicative data (2), the image data obtained by expanding the print file is used as its index image data.

Figure 10:
FIG. 10 shows exemplary index data outputted from the image-processing device according to a fifth embodiment of the present invention.

Referring to FIG. 10, in a fifth embodiment, the portion of the additional information created responsible for the determination that each print file is distinguishable is highlighted or emphasized so that the portion is outputted in a different way from the rest of the portion.

While the invention has been described in detail with reference to the embodiments thereof, it would be apparent to those skilled in the art that various changes and modifications may be made therein without departing from the spirit of the invention.

In FIG. 10, the portion responsible for the determination that each print file is distinguishable is highlighted by employing a bolder font than the font employed for the rest. However, the portion can also be highlighted by employing a color font different from the color of the font employed for the rest for outputting (printing).

In the fifth embodiment, this increases visibility thereby allows the user to easily distinguish one print file from the others.

In the above embodiments, the alternative image data stored in the storage unit 15 indicates a detail of the additional information of each print file. In FIG. 4, the alternative image data indicates the extension specifying the files' format. However, the present invention is not limited to this case.

In the fourth embodiment, the largest-sized file, the plural indistinguishable print files, is regarded as distinguishable. However, print files having a predetermined size or larger out of the plural indistinguishable print files can also be regarded as distinguishable.

Further, in the foregoing embodiments, index data is created for the print files stored in the external storage 30. However, index data may be created for the print files stored in a storage unit included in the printer 10.

Further, in the foregoing embodiments, index data is printed out. However, index data may also be displayed on the display unit 13 instead.

Further, in the foregoing embodiments, any one piece of the alternative image data stored in the storage unit 15 is used for the index image of each distinguishable file. However, the index image for each distinguishable file does not necessarily have to be displayed. Alternatively, the format of each distinguishable file may be displayed as its index image without employing the image data stored in the storage unit 15.

Further, in the foregoing embodiments, whether or not each file is distinguishable is determined by the comparison between file names. However, this determination may be made also in consideration of another type of additional information together with the file name. For example, date and time of creation or update, and file format information are also available.

Further, in the foregoing embodiments, the connecting terminal 14 is the USB (Universal Serial Bus)-compliant interface. However, the connecting terminal may be another industry standard.

What is claimed is:

1. An image-processing device comprising:
   a first memory that stores a first file and a second file, the first file including first printing data and first additional information, and the second file including second printing data and second additional information, the first and second additional information comprising the file names of the first and second printing data, respectively;
   a second memory that stores alternative image data, the alternative image data being predetermined independent of the first and second printing data;
   a determining unit configured to determine whether or not the first file is a distinguishable file, the distinguishable file being distinguishable from the second file based on a difference between characters of the first additional information and characters of the second additional information being a predetermined ratio or larger;
   a creating unit configured to create an index sheet having index data based on a determination made by the determining unit, the index data including first thumbnail data corresponding to the first file and second thumbnail data corresponding to the second file, the creating unit inserting into the index sheet the index data with the alternative image data and the first additional information as the first thumbnail data upon the determining unit determining that the first file is the distinguishable file, the creating unit inserting into the index sheet the index data with the first additional information and image data that is obtained by expanding the first file as the first thumbnail data upon the determining unit determining that the first file is not the distinguishable file; and
   an outputting unit that outputs the index image sheet having the index.

2. The image-processing device according to claim 1, wherein the creating unit creates the index data including first image data and the first additional information as the first thumbnail data and second image data and the second additional information as the second thumbnail data upon the determining unit determining that the first file is not the distinguishable file, the first image data indicating content of the first printing data and the second image data indicating content of the second printing data.

3. The image-processing device according to claim 2, wherein the first image data is created by rasterizing the first file, and second image data is created by rasterizing the second file.

4. The image-processing device according to claim 2, wherein the first memory stores the first image data and the second image data.

5. The image-processing device according to claim 2, wherein the alternative image data is smaller in size than each of the first image data and the second image data.

6. The image-processing device according to claim 2, further comprising a selecting unit selecting one of the first file and second file upon the determining unit determining that the first file is not the distinguishable file,
   wherein the creating unit creates the index data including the alternative image data as one of the first image data and the second image data corresponding to one of the first file and the second file selected by the selecting unit.

7. The image-processing device according to claim 6, wherein the first additional information includes size of the first file and the second additional information includes size of the second file,
   wherein the selecting unit selects the first file when the first file is greater in size than the second file by comparing the size of the first file with the size of the second file.

8. The image-processing device according 6, wherein the first additional information includes first update information when the first file has been updated, and the second additional information includes second update information when the second file has been updated,
   wherein the selecting unit selects the first file when the first file has been updated later than the second file by comparing the first update information with the second update information.

9. The image-processing device according to claim 1, wherein the first additional information includes a file name of the first file, and the second additional information includes a file name of the second file.

10. The image-processing device according to claim 9, wherein the determining unit determines that the first file is the distinguishable file when a matching rate between the first file and the second file is equal to or greater than a predetermined percentage, the matching rate being calculated by comparing the name of the first file with the name of the second file.

11. The image-processing device according to claim 10, wherein the index data includes a first name part corresponding to a first part of the name of the first file and a second name part based on a second part of the name of the second file, the first part being same in size as the second part,
    wherein the matching rate is calculated by comparing the name of the first file with the name of the second file.

12. The image-processing device according to claim 1, wherein the outputting unit outputs the index data having the first additional information and the second additional information highlighted, upon the determining unit determining that the first file is the distinguishable file.

13. The image-processing device according to claim 1, wherein the outputting unit displays the index sheet.

14. The image-processing device according to claim 1, wherein the outputting unit prints the index sheet on a recording medium.

15. The image-processing device according to claim 1, further comprising a main body having a connecter,
    wherein the first memory is detachably connected to the connecter.

16. The image-processing device according to claim 15, wherein the main body includes the second memory.

17. A method executed by an image-processing device, the method comprising:
    determining whether or not a first file is a distinguishable file, the distinguishable file being distinguishable from a second file based on a difference between characters of a first additional information and characters of a second additional information being a predetermined ratio or larger, the first file including first printing data and the first additional information, and the second file including second printing data and the second additional information, the first and second additional information comprising the file names of the first and second printing data, respectively;

creating an index sheet having index data including first thumbnail data corresponding to the first file and second thumbnail data corresponding to the second file, the index data being created with alternative image data and the first additional information as the first thumbnail data upon the determining step determining that the first file is the distinguishable file, the alternative image data being predetermined independent of the first and second printing data;

inserting into the index sheet the index data with the first additional information and image data that is obtained by expanding the first file as the first thumbnail data upon the determining unit determining that the first file is not the distinguishable file; and outputting the index image sheet having the index data.

18. A non-transitory computer readable recording medium storing a set of program instructions executable on an image-forming device, instructions when executed comprising:

determining whether or not a first file is a distinguishable file, the distinguishable file being distinguishable from a second file based on a difference between characters of a first additional information and characters of a second additional information being a predetermined ratio or larger, the first file including first printing data and the first additional information, and the second file including second printing data and the second additional information, the first and second additional information comprising the file names of the first and second printing data, respectively;

creating an index sheet having index data including first thumbnail data corresponding to the first file and second thumbnail data corresponding to the second file, the index data being created with alternative image data and the first additional information as the first thumbnail data upon the determining step determining that the first file is the distinguishable file, the alternative image data being predetermined independent of the first and second printing data;

inserting into the index sheet the index data with the first additional information and image data that is obtained by expanding the first file as the first thumbnail data upon the determining unit determining that the first file is not the distinguishable file; and outputting the index sheet having the index data.

* * * * *